United States Patent
Denning et al.

[11] Patent Number: 6,138,187
[45] Date of Patent: Oct. 24, 2000

[54] METHOD AND SYSTEM FOR INCREASING SPATIAL REUSE IN A SERIAL STORAGE ARCHITECTURE SUBSYSTEM

[75] Inventors: Donald Eugene Denning; Robert George Emberty; Craig Anthony Klein, all of Tucson, Ariz.

[73] Assignee: International Business Machines Corporation, Armonk, N.Y.

[21] Appl. No.: 09/137,884

[22] Filed: Aug. 21, 1998

[51] Int. Cl.$^7$ ........................................ G06F 3/00
[52] U.S. Cl. .................. 710/52; 710/29; 710/31; 710/36; 710/37; 709/238; 709/239; 709/251
[58] Field of Search .................... 709/238, 239, 709/251; 710/29, 31, 36, 37, 38, 52, 126, 128, 129, 107, 113

[56] References Cited

U.S. PATENT DOCUMENTS

| | | | |
|---|---|---|---|
| 3,702,006 | 10/1972 | Page ............................................. | 444/1 |
| 4,435,752 | 3/1984 | Winkelman ............................... | 364/200 |
| 4,528,624 | 7/1985 | Kamionka et al. ....................... | 364/200 |
| 4,926,418 | 5/1990 | Cidon et al. ............................. | 370/455 |
| 5,121,390 | 6/1992 | Farrell et al. .......................... | 370/94.1 |
| 5,159,677 | 10/1992 | Rubsam et al. .......................... | 395/425 |
| 5,297,137 | 3/1994 | Ofek et al. .............................. | 370/403 |
| 5,388,266 | 2/1995 | Frey et al. .............................. | 395/700 |
| 5,446,737 | 8/1995 | Cidon et al. ............................ | 370/452 |
| 5,892,772 | 4/1999 | Hauris et al. ........................... | 370/477 |
| 5,892,913 | 4/1999 | Adiga et al. ............................ | 709/219 |
| 5,925,119 | 7/1999 | Maroney .................................. | 710/126 |
| 5,931,958 | 9/1999 | Bouvier et al. .......................... | 714/48 |
| 5,948,089 | 9/1999 | Wingard et al. ......................... | 710/107 |
| 6,012,118 | 1/2000 | Jayakumar et al. .................... | 710/126 |

*Primary Examiner*—Ayaz R. Sheikh
*Assistant Examiner*—Rupal D. Dharta
*Attorney, Agent, or Firm*—Robert M. Sullivan; Felsman, Bradley, Vaden, Gunter & Dillon, LLP

[57] ABSTRACT

An initiator device, in a data processing system utilizing a Serial Storage Architecture subsystem, directs an I/O process via secondary path if a primary path is unavailable, even if the primary path is shorter. Also, an initiator device may send outbound data frames, on a secondary path, simultaneously with the SCSI command. Additional flexibility is attained by utilizing an adapter and target storage devices that all support Out of Order Transfers ("OOT"). If a target supports OOT, individual data frames that comprise an I/O process may be sent on multiple paths, allowing greater flexibility in routing. Also, an initiator device may send outbound data frames, on an alternate path, simultaneously with the SCSI command.

9 Claims, 5 Drawing Sheets

METHOD AND SYSTEM FOR INCREASING SPATIAL REUSE IN A SERIAL STORAGE ARCHITECTURE SUBSYSTEM

BACKGROUND OF THE INVENTION

1. Technical Field

The present invention relates in general to data processing systems and in particular to data processing systems utilizing a Serial Storage Architecture ("SSA"). Still more particularly, the present invention relates to maximizing simultaneous reads and writes utilizing intelligent routing through the Serial Storage Architecture adapter ports.

2. Description of the Related Art

Serial Storage Architecture (SSA) is a serial form of Small Computer System Interface ("SCSI") and is an American National Standards Institute ("ANSI") standard interface used to link multiple storage devices (storage subsystem) to a host data processing system. Communications (I/O process) between the host data processing system and the storage subsystem occur between an initiator device (host) and a target device (generally a storage device). An I/O process is a method of accomplishing a communications task with an input/output device and usually involves multiple steps.

A typical host connection, involving SSA, utilizes an adapter/interface with two bi-directional ports connected serially to a string of target storage devices forming a bi-directional loop with one end at each port. SSA loops are full-duplex and allow simultaneous two-way (bi-directional) I/O communications, which permits more than one I/O process at a time.

Each target storage device connected to the SSA bi-directional loop has its own buffer in which any data frame ("frame") that passes through the target storage device port is buffered. As a frame is received on the inbound side of a port, the receiving port assesses whether or not the frame is addressed to the target storage device. If the frame is not addressed to the target storage device, the receiving port can either begin to send the frame to the outbound port or, if the receiving port has proper authority, the receiving port may hold on to the incoming frame, transmit the outbound port's frame and pass the received frame afterward. At a given point in time each port may or may not have part or all of a frame or frames buffered and there may be multiple frames travelling through a target storage device port simultaneously.

The data traffic through the adapter/interface is analogous to a continuous circular subway system. The cars are always moving through the tunnel (loop), whether there is any payload or not. As long as there is an empty spot on the train to place a frame, a frame may be inserted into that spot. In order to maximize the throughput of the interface, all the cars on the train should be filled with data frames. To complete the analogy, as SSA is a bi-directional interface, there are two trains within the continuous circular subway system, one traveling in each direction.

The concept of having multiple frames traveling through the interface at a particular time, hence sharing the I/O interface by multiple, simultaneous processes, is called "spatial reuse." In order to maximize the system performance, the traffic, or flow of data frames, needs to be balanced so that all "space" is filled with data frames in both directions through a loop. An architectural limitation of SSA, created by the method of addressing, requires a target storage device to return datand status to an initiator device utilizing the same port from which the command was received.

However, each target storage device within the storage subsystem may be accessed from either host system adapter/interface bi-directional port. When the storage subsystem is initialized, an initiator device in the loop builds a configuration table detailing available paths to each device. Typically, after accessing the table, the initiator device will access each device through the adapter by a shortest available path and use a secondary, or longer path, only in the event of a loss of connection in the primary path. This provides a simple means of routing I/O communications, but does nothing to balance the reads and writes through the adapter port.

In known implementations, the adapter accesses devices via the shortest path available. Adapters utilize alternate paths (i.e., the opposite direction in the loop) only in the event of a loss of connection. Maximizing the number of simultaneous reads and writes is difficult when there is only one port and a few devices. As the number of adapter ports and target devices in the loop increases, the opportunities for simultaneous reads and writes also increase.

Limitations on the I/O process which are required by known configurations of data processing systems utilizing a SSA subsystem restrict the capability of the SSArchitecture. A prior art example, illustrated in FIG. 5, depicts a high level logic flow diagram of the prior art I/O process between an initiator device and a target storage device, utilizing a Serial Storage Architecture (SSA) subsystem. The process begins with step 500, which illustrates the beginning of the I/O process between an initiator device and a target storage device. The process then proceeds to step 502, which depicts a determination of whether or not the shorter, or primary, path to the target storage device is available. If the primary path is not available, the adapter returns to step 502 until the primary path becomes available. If the primary path is available, the process passes instead to step 504, which depicts communication between the initiator device and the target storage device. The process continues to step 506, which illustrates a determination of whether or not the I/O process is complete. If not, the process then returns to step 502 and repeats steps 502 through 506 until the I/O process is complete.

Referring again to step 506, if the I/O process is complete, the process proceeds to step 508, which depicts transmittal of a complete signal and a receive status to the initiator device by the target storage device. The process then proceeds to step 510, which illustrates an I/O process end signal transmitted to the initiator device by the target storage device.

As illustrated in FIG. 5, once an I/O process is started in the shorter of two paths, the adapter is committed to the same path for all frames in the I/O process. Adapters are limited to accessing devices, with a complete command/data I/O process, in the shorter of two paths and only utilize an alternate path (opposite direction in the loop) in the event of the loss of a connection.

It would be desirable, therefore, to provide a method of intelligent routing that would utilize the shorter path to a target storage device, if available, or utilize an alternate path if the shorter path is not available. Also, it would be desirable to utilize Out of Order Transfers to maximize the number of simultaneous reads and writes through an adapter in a data processing system utilizing SSA.

SUMMARY OF THE INVENTION

It is therefore one object of the present invention to provide a method, for use with Serial Storage Architecture subsystems, that will provide maximum flexibility in routing write data.

It is another object of the present invention to provide a method, for use with Serial Storage Architecture subsystems, that will allow an adapter to route an I/O process via secondary, or alternate, path instead of the primary path.

It is yet another object of the present invention to provide a method, for use with Serial Storage Architecture subsystems, that will allow an initiator device to send a command to a target device via primary path while simultaneously sending data associated with the command to the target device via secondary, or alternate, path.

It is a further object of the present invention to provide a method, for use with Serial Storage Architecture subsystems, that will allow blocks of write data to be sent to a target storage device via multiple paths in the order the write data becomes available, rather than the order in which the write data is written.

The foregoing objects are achieved as is now described. An initiator device, in a data processing system utilizing a Serial Storage Architecture subsystem, directs an I/O process via secondary path if a primary path is unavailable, even if the primary path is shorter. Also, an initiator device may send outbound data frames, on a secondary path, simultaneously with the SCSI command. Additional flexibility is attained by utilizing an adapter and target storage devices that all support Out of Order Transfers ("OOT"). If a target storage device requires that data be received in the order that it is to be written, then the data must all travel the same path from the initiator device to the target storage device to ensure serialized delivery. However, if a target supports OOT, individual data frames that comprise an I/O process may be sent on multiple paths, allowing greater flexibility in routing. The target storage device reassembles the data in the proper sequence in a buffer based on pointers that are sent with the data.

The three embodiments: routing an I/O process along a secondary path; simultaneously routing a command along a primary path and associated datalong a secondary path and employing Out of Order Transfers to transmit an I/O process, provide maximum flexibility and optimal spatial reuse.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
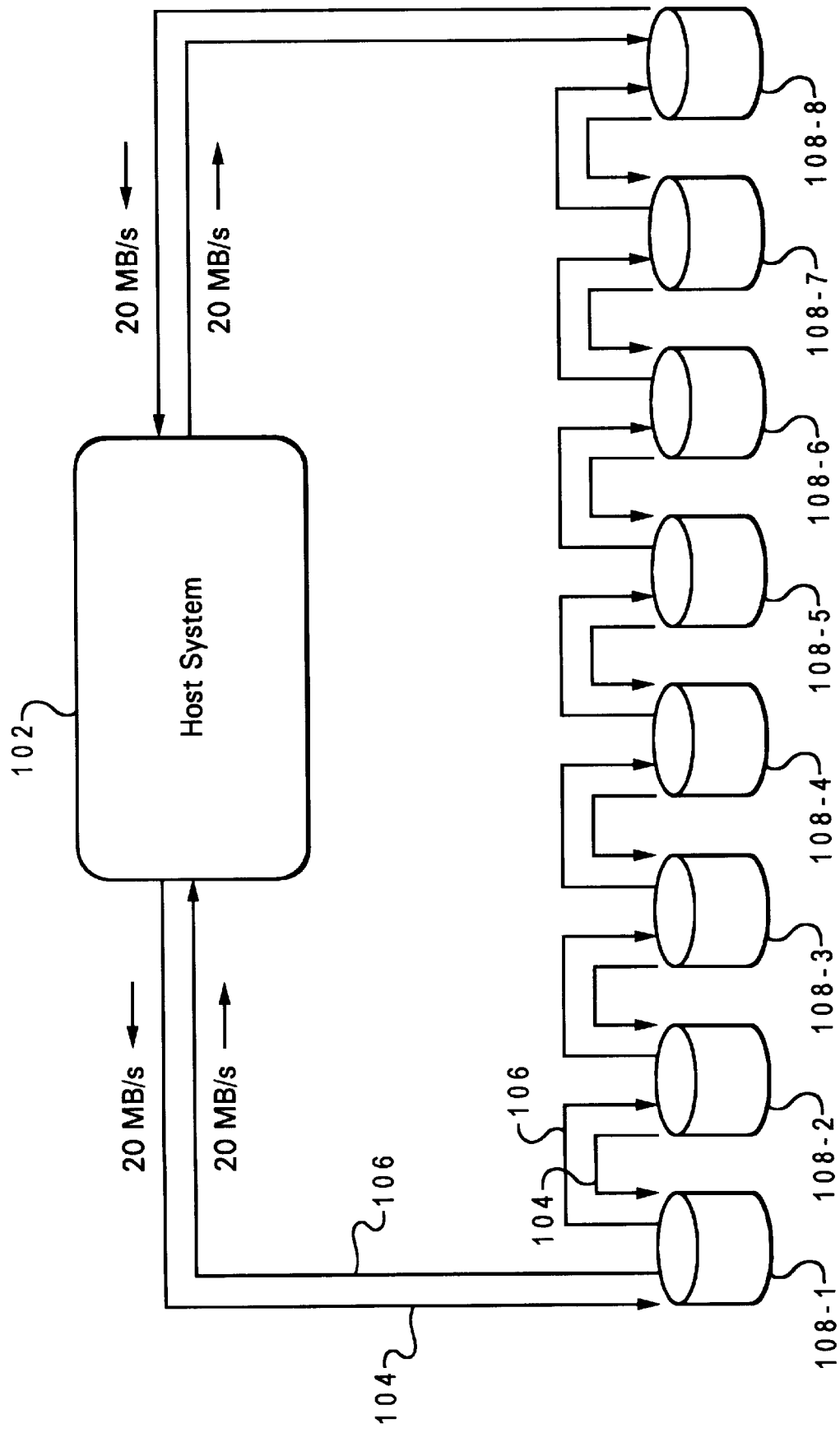
FIG. 1 depicts a high level block diagram of a data processing system having a Serial Storage Architecture subsystem with multiple target storage devices which may be utilized to implement the method and system of the present invention.

With reference now to the figures, and in particular with reference to FIG. 1, a high level block diagram, is depicted, of a data processing system having a Serial Storage Architecture subsystem with multiple target storage devices which may be utilized to implement the method and system of the present invention. Data processing system 102 includes an initiator device (not shown) and an adapter/interface (not shown) that communicates with one of multiple target storage devices 108 via communication loops 104 and/or 106. A typical approach to sending I/Os to a target device is to use the shortest path possible. For instance, an I/O process between the initiator device, in host system 102 and target storage device 108-3, would likely be routed via loop 104, the shorter path. Even though loop 106 may be available, known logic requires the I/O process be routed utilizing the shorter path.

Figure 2:
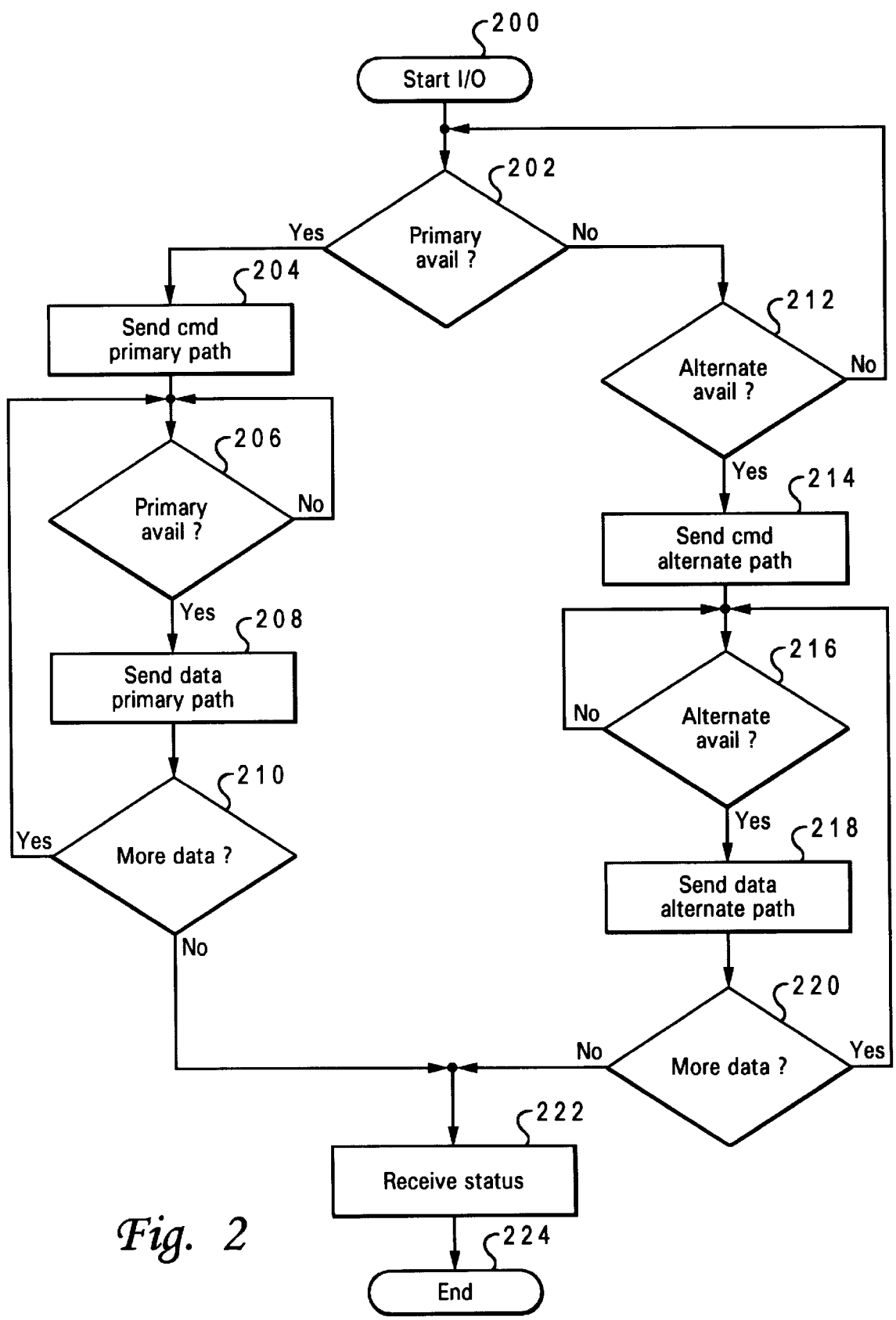
FIG. 2 is a high level logic flow diagram of a of an I/O process between an initiator device and a target storage device, utilizing a Serial Storage Architecture subsystem, wherein the communication is routed via primary path or a secondary path in accordance with the method and system of the present invention.

Referring now to FIG. 2, a high level logic flow diagram of a first embodiment of an I/O process between an initiator device and a target storage device, utilizing a Serial Storage Architecture subsystem, wherein the communication is routed via primary path or a secondary path, is illustrated. The process begins with step 200, which depicts initiating an I/O process between an initiator device and a target storage device. The process then proceeds to step 202, which illustrates a determination of whether a primary path is available for the I/O process. If the primary path is not available, the process then proceeds to step 202, which depicts a determination of whether or not a secondary (alternate) path is available. If the secondary path is not available, the process then returns to step 202 in an iterative fashion. Referring again to step 202, if a determination is made that the primary path is available, the process then proceeds to step 204, which illustrates the transmittal of a command by the initiator device via the primary path to the target storage device. The process next passes to step 206, which depicts a determination of whether or not the primary path is available. If the primary path is not available, the process returns to step 206 until the primary path becomes available. As the primary path becomes available, the process next passes to step 208, which illustrates data being sent from the initiator device to the target storage device via the primary path. The process continues to step 210, which illustrates a determination of whether or not more data is to be transmitted. If more data is to be transmitted, the process returns iteratively to step 206 and continues through to step 208 and step 210 until there is no more data to be transmitted. After a determination that there is no more data, the process then proceeds to step 222, which depicts a receive status signal sent to the initiator device, by the target storage device.

Referring again to step 202, if the primary path is not available, the process then proceeds to step 212. As indicated above, step 212 illustrates a determination of whether the secondary path is available. If the secondary path is available, the process then proceeds to step 214, which illustrates a command sent by the initiator device through the target storage device via the secondary path. The process next proceeds to step 216, which depicts determination of whether the secondary path is available. If the secondary path is not available the process returns to step 216 and repeats until the secondary path becomes available. If the determination is made that the secondary path is available, the process next passes to step 218, which illustrates data sent by the initiator device via the secondary path.

Next, the process passes to step 220, which depicts a determination of whether or not there is more data to be sent. If there is more data to be sent, the process returns to step 216 and repeats steps 216, 218 and 220 in an iterative fashion. If there is no more data to be sent the process then passes to step 222, which depicts the transmission of a signal by the target storage device to the initiator device, indicating that the I/O process is complete. The process continues to step 224, which illustrates the transmission by the target storage device of a completion signal to the initiator device.

In accordance with the present invention, the I/O process may be routed via primary path or a secondary path, which allows the adapter to choose either path for transfer. This improves on the present method which determines the shortest path and directs the I/O process along that path even though that path may be busy. The I/O process must wait for the short path to free up, even though the longer path may already be free.

Figure 3:
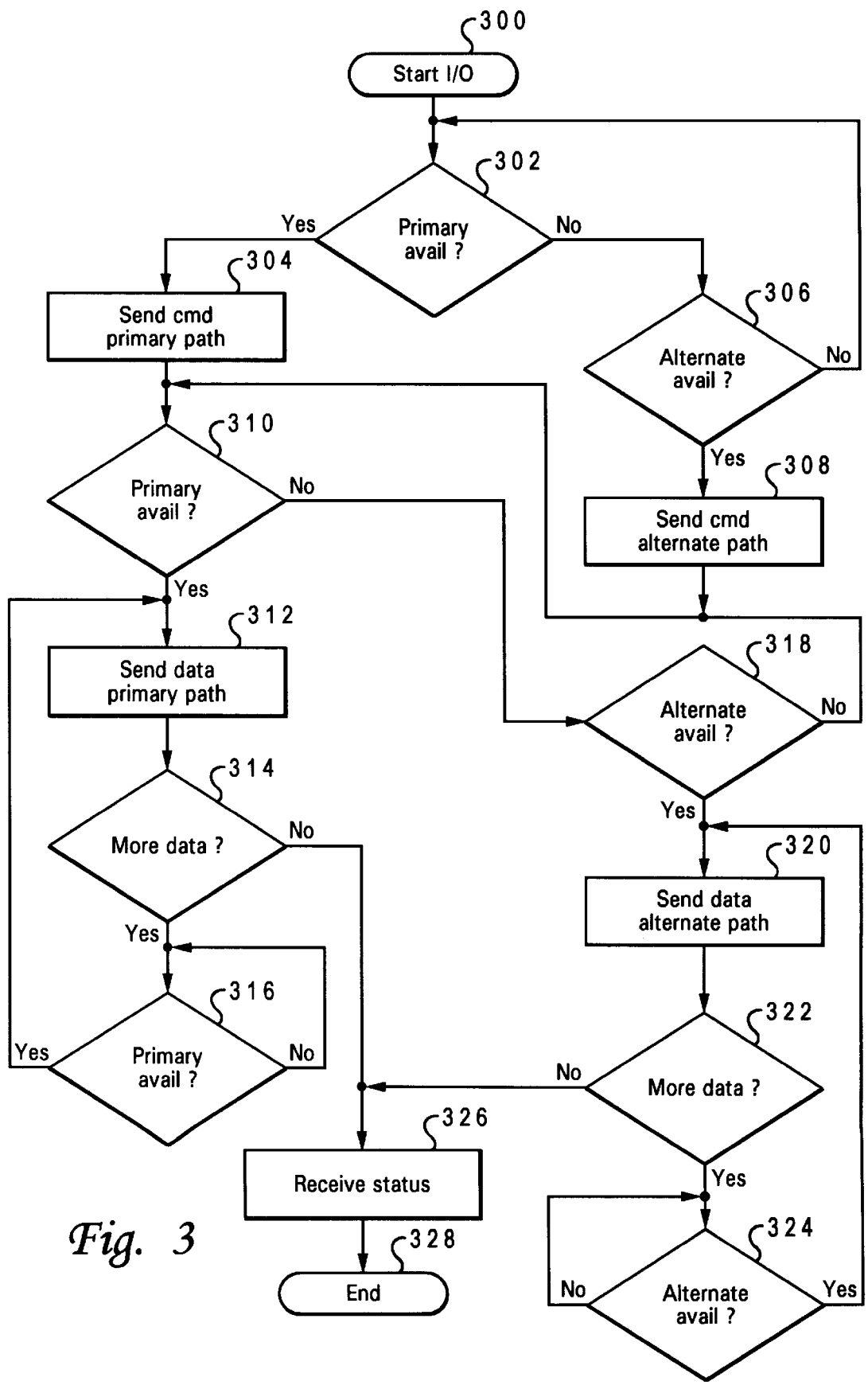
FIG. 3 depicts a high level logic flow diagram of an I/O process between an initiator device and a target storage device, utilizing a Serial Storage Architecture subsystem, wherein write communications between the initiator device and the target storage device is routed via primary path or a secondary path based on availability of either path in accordance with the method and system of the present invention.

Turning to FIG. 3, a high level logic flow diagram of a second embodiment of an I/O process between an initiator device and a target storage device, utilizing a Serial Storage Architecture subsystem, wherein write communications between the initiator device and the target storage device is routed via primary path or a secondary path based on availability of either path, is depicted. The process begins with step 300, which depicts the initiation of an I/O process between an initiator device and a target storage device within a Serial Storage Architecture (SSA) subsystem. The process continues to step 302, which illustrates a determination of whether or not a primary path is available for the I/O process. If the primary path is not available, the process proceeds to step 306, which illustrates a determination of whether or not a secondary path is available. If the secondary path is not available, the process returns to step 302. If it is determined that there is a primary path available, the process proceeds from step 302 to step 304, which depicts transmission of a command by the initiator device via the primary path to the target storage device. The process next passes to step 310, which illustrates a determination of whether or not the primary path is available. Referring again to step 306, if a determination is made that the secondary path is available, the process then passes to step 308, which illustrates a transmission of a command sent by the initiator device, via the secondary path. The process next passes to step 310, which illustrates a determination of whether or not the primary path is available.

If the primary path is not available, the process next passes to step 318, which depicts a determination of whether or not the secondary path is available. If the secondary path is not available, the process returns to step 310. However, if the secondary path is available, the process instead proceeds to step 320, which illustrates the transmission of data, by the initiator device, via the secondary path to the target storage device. The process continues to step 322, which illustrates a determination of whether there is more data to be sent to the target storage device. If there is more data to be sent to the target storage device, the process next passes to step 324, which depicts a determination of whether or not the secondary path is available. If the secondary path is available, the process then returns to step 320 and repeats step 322 and step 324 in an iterative fashion. If the secondary path is not available, the process returns to step 324 until the secondary path becomes available. Returning to step 322, if there is a determination that there is no more data to be transmitted by the initiator device to the target storage device, the process then proceeds to step 326, which illustrates a transmission of a signal by the target storage device that indicates reception of the command and data.

Referring to step 310, if the determination is made that the primary path is available, the process next proceeds to step 312, which illustrates the transmission of data, by the initiator device, to the target storage device via the primary path. The process next proceeds to step 314, which depicts a determination of whether or not there is more data to be transmitted via the secondary path. If the determination is made that there is more data to be sent, the process next passes to step 316, which illustrates a determination of whether the primary path is available. If the primary path is not available, the process returns to step 316 until the primary path becomes available. If the primary path is available, the process returns to step 312 and repeats step 312 and step 314 in an iterative fashion. If the determination is made in step 314, that there is no more data to be transmitted by the initiator device to a target storage device, the process next proceeds to step 326, which illustrates transmission of a receive status signal by the target storage device to the initiator device. The process then continues to step 328, which depicts a signal, transmitted by the target storage device to the initiator device that the I/O process is complete.

Figure 4:
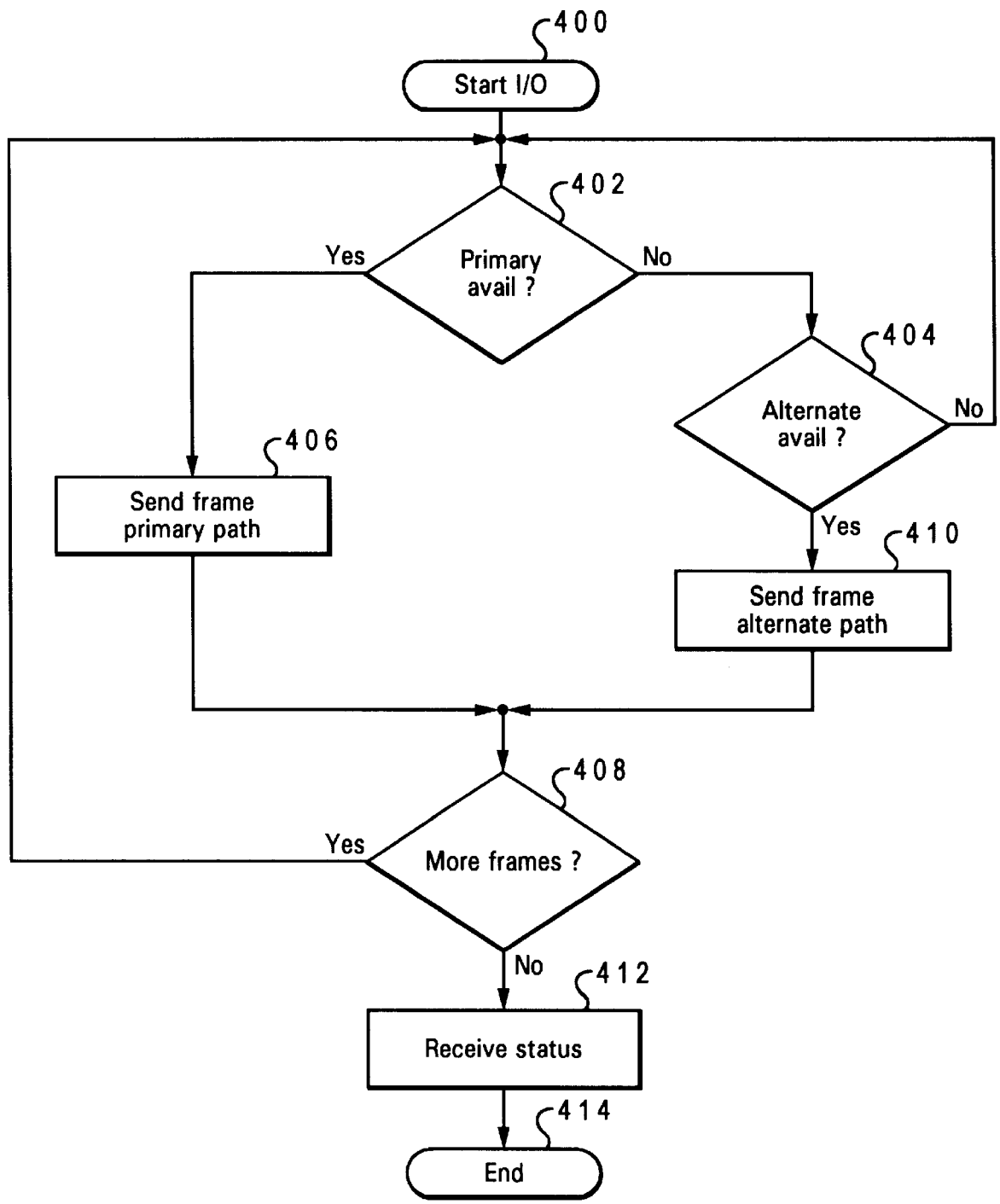
FIG. 4 illustrates a high level logic flow diagram of an I/O process between an initiator device and a target storage device, utilizing a Serial Storage Architecture subsystem, wherein both adapter interface and target storage devices support Out of Order Transfers in accordance with the method and system of the present invention.
Figure 5:
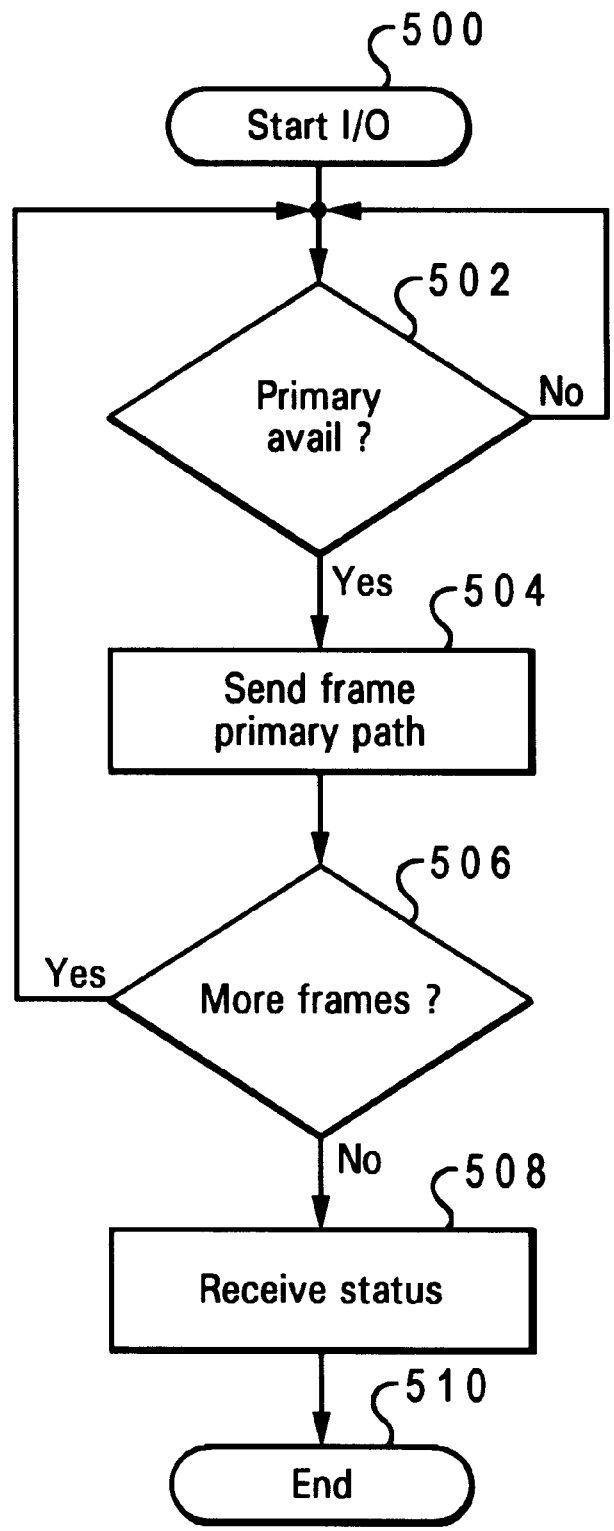
FIG. 5 depicts a high level logic flow diagram of a prior art I/O process between an initiator device and a target storage device, utilizing a Serial Storage Architecture subsystem.

Rather than direct the complete I/O process via short path exclusively, the present method allows a command to be transmitted via primary path and data to be transmitted via secondary path, simultaneously. The bi-directional ports and bi-directional loops are used efficiently and throughput is improved Referring to FIG. 4, a high level logic flow diagram of an I/O process between an initiator device and a target storage device, utilizing a Serial Storage Architecture subsystem, wherein both adapter interface and target storage devices support Out of Order Transfers, is illustrated. The process begins with step 400, which depicts the initiation of an I/O process between an initiator device and a target storage device within a serial storage architecture subsystem. The process next passes to step 402, which illustrates a determination of whether a primary path is available. If a primary path is not available, the process passes to step 404, which depicts a determination of whether a secondary path is available.

If a secondary path is not available, the process then returns to step 402. If, at step 402, the determination is made that the primary path is available, the process then proceeds to step 406, which depicts a transmission of a data frame via the primary path by the initiator device to the target storage device. The process next continues to step 408, which illustrates a determination of whether or not there are more data frames. Returning to step 404, if the determination is made that a secondary path is available, the process next passes to step 410, which illustrates a transmission of a data frame by the initiator device, to the target storage device via the secondary path. The process continues to step 408, where a determination is made whether or not there are more data frames to be sent to the target storage device. If there are more data frames, the process returns to step 402, where a determination is made as to whether or not a primary path or a secondary path is available and the process is repeated until there are no more data frames to send. The process then passes to step 412, which depicts a transmission of a receive status signal to the initiator device. The process then proceeds to step 414, which illustrates a transmission of a signal sent by the target storage device to the initiator device that the I/O process is complete.

The present process in which Out of Order Transfers are utilized, improves data transfer efficiency and utilizes both primary and secondary path as each path becomes available during transmission. This method allows for transmission of data in the order that the data becomes available, because the data is re-assembled, in a target storage device buffer, in the proper sequence.

While the invention has been particularly shown and described with reference to a preferred embodiment, it will be understood by those skilled in the art that various changes in form and detail may be made therein without departing from the spirit and scope of the invention.

What is claimed is:

1. A method for maximizing spatial reuse in a data processing system having a Serial Storage Architecture subsystem, an initiator device, an adapter which supports Out of Order Transfers, a plurality of storage devices having individual buffers, each of which support Out of Order Transfers, at least two bi-directional ports, a bi-directional loop interposed between said adapter and said plurality of storage devices, comprising:

initiating an I/O process between said initiator device and a selected one of said plurality of storage devices;

consulting a pre-determined configuration table to ascertain a primary path via said bi-directional loop, between said initiator device and a selected one of said plurality of storage devices;

determining if said primary path is available;

transmitting a command to said selected one of said plurality of storage devices via said primary path if said primary path is available, otherwise;

transmitting said command via secondary path if available; and transmitting write data to said selected one of said plurality of storage devices via said primary path or said secondary path in the order said write data becomes available.

2. The method of claim 1, wherein transmitting write data to said selected one of said plurality of storage devices via said primary path or said secondary path in the order said write data becomes available, further comprises:

receiving said write data into said selected one of said plurality of storage devices having a buffer and supporting Out of Order Transfers;

re-assembling said write data into a proper sequence utilizing pointers attached to said data; and executing said command utilizing said re-assembled write data.

3. The method in claim 2, further comprising:

receiving write data into said buffer of said selected one of said plurality of storage devices;

reassembling said write data in said buffer; and sending said reassembled write data to storage memory of said selected one of said plurality of storage devices.

4. A system for maximizing spatial reuse in a data processing system having a Serial Storage Architecture subsystem, an initiator device, an adapter which supports Out of Order Transfers, a plurality of storage devices having individual buffers, each of which support Out of Order Transfers, at least two bi-directional ports, a bi-directional loop interposed between said adapter and said plurality of storage devices, comprising:

communication means for initiating an I/O process between said initiator device and a selected one of said plurality of storage devices;

a pre-calculated configuration table for determining a primary path, via said bi-directional loop, between said initiator device and a selected one of said plurality of storage devices;

calculation means for determining if said primary path is available;

communication means for transmitting a command to said selected one of said plurality of storage devices via said primary path if said primary path is available, otherwise;

communication means for transmitting said command via secondary path, if available; and communication means for transmitting write data to said selected one of said plurality of storage devices via said primary path or said secondary path in the order said write data becomes available.

5. The system of claim 4, wherein communication means for transmitting write data to said selected one of said plurality of storage devices via said primary path or said secondary path in the order said write data becomes available, further comprises:

means for receiving said write data into said selected one of said plurality of storage devices having a buffer and supporting Out of Order Transfers; and compilation means for re-assembling said write data into a proper sequence utilizing pointers attached to said data.

6. The system of claim 5, further comprises:

means for receiving write data into said buffer of said selected one of said plurality of storage devices;

compilation means for re-assembling said write data in said buffer of said selected one of said plurality of storage devices; and communication means for directing said reassembled write data to a storage memory of said selected one of said plurality of storage devices.

7. A computer program product within a computer usable medium for maximizing spatial reuse in a data processing system having a Serial Storage Architecture subsystem, an initiator device, an adapter which supports Out of Order Transfers, a plurality of storage devices having individual buffers, each of which support Out of Order Transfers, at least two bi-directional ports, a bi-directional loop interposed between said adapter and said plurality of storage devices, comprising:

instructions within said computer usable medium for initiating an I/O process between said initiator device and a selected one of said plurality of storage devices;

instructions within said computer usable medium for consulting a pre-determined configuration table to ascertain a primary path via said bi-directional loop, between said initiator device and a selected one of said plurality of storage devices;

instructions within said computer usable medium for determining if said primary path is available;

instructions within said computer usable medium for transmitting a command to said selected one of said plurality of storage devices via said primary Path if said primary path is available, otherwise;

instructions within said computer usable medium for transmitting said command via secondary path if available; and instructions within said computer usable medium for transmitting write data to said selected one of said plurality of storage devices via said primary path or said secondary path in the order said write data becomes available.

8. The computer program product of claim 7, wherein transmitting write data to said selected one of said plurality of storage devices via said primary path or said secondary oath in the order said write data becomes available, further comprises:

instructions within said computer usable medium for receiving said write data into said selected one of said plurality of storage devices having a buffer and supporting Out of Order Transfers; assembling said write data into a proper sequence utilizing pointers attached to said data; and instructions within said computer usable medium for executing said command utilizing said re-assembled write data.

9. The computer program product in claim 8, further comprising:

instructions within said computer usable medium for receiving write data into said buffer of said selected one of said plurality of storage devices;

instructions within said computer usable medium for reassembling said write data in said buffer; and instructions within said computer usable medium for sending said reassembled write data to storage memory of said selected one of said plurality of storage devices.

* * * * *